US006696701B2

(12) United States Patent
Hector et al.

(10) Patent No.: US 6,696,701 B2
(45) Date of Patent: Feb. 24, 2004

(54) ELECTROSTATIC DISCHARGE PROTECTION FOR PIXELLATED ELECTRONIC DEVICE

(75) Inventors: Jason R. Hector, Redhill (GB); Neil C. Bird, Horsham (GB); Steven C. Deane, Redhill (GB); Takashi Ohmoto, Hiroshima (JP); Hidetoshi Watanabe, Kobe (JP)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/205,554

(22) Filed: Jul. 25, 2002

(65) Prior Publication Data

US 2003/0030054 A1 Feb. 13, 2003

(30) Foreign Application Priority Data

Aug. 8, 2001 (GB) .............................. 0119299

(51) Int. Cl.[7] .............................. H01L 29/04
(52) U.S. Cl. .................... 257/72; 257/173; 257/175; 257/355; 257/356; 257/360; 257/59
(58) Field of Search .................... 257/72, 173, 175, 257/355, 356, 360, 59

(56) References Cited

U.S. PATENT DOCUMENTS

| 5,744,837 A | * | 4/1998 | Kamiura et al. | 257/355 |
| 5,936,687 A | | 8/1999 | Lee | 349/40 |
| 5,973,658 A | | 10/1999 | Kim et al. | 345/92 |
| 6,013,923 A | * | 1/2000 | Huang | 257/59 |

* cited by examiner

Primary Examiner—Nathan J. Flynn
Assistant Examiner—Remmon R. Fordé

(57) ABSTRACT

An electronic device (10) comprises an array of pixels (12), arranged in rows and columns (14,16) with row and column address lines (18,20) for addressing each pixel (12). Each row and column address line is connected to two discharge lines (30,32) through a discharge circuit (38). The circuit allows the passage of charge between the address line and the first discharge line (30) when the address line is at a potential below that of the first discharge line, and allows the passage of charge between the address line and the second discharge line (32) when the address line is at a potential above that of the second discharge line. This provides electrostatic discharge protection against an increase or decrease in voltage on the row or column address lines during manufacture of the device. By providing suitable voltages on the two discharge lines during operation of the manufactured device, it is possible to prevent the discharge circuit from operating, thereby saving power.

20 Claims, 5 Drawing Sheets

ELECTROSTATIC DISCHARGE PROTECTION FOR PIXELLATED ELECTRONIC DEVICE

TECHNICAL FIELD

This invention relates to electrostatic discharge protection for electronic devices comprising arrays of pixels.

BACKGROUND AND SUMMARY OF THE INVENTION

Electrostatic discharge (ESD) damage is a well known phenomenon which can occur during the fabrication of semiconductor devices, such as metal-oxide semiconductor (MOS) structures. In particular, ESD damage can result in gate insulating layer breakdown, large shifts in threshold voltages and large leakage currents between transistor electrodes.

ESD damage has been found to be a particular problem during the fabrication of devices using arrays of thin film transistors (TFTs), such as those serving as pixel switching elements in pixellated devices. Arrays of these transistors are used in, for example, active matrix liquid crystal displays and other active matrix display devices, and in sensing array devices such as radiation imaging detectors as well. During fabrication, significant quantities of charge may form on the source and drain electrodes of the TFTs. In particular, the row and column conductors used to address the individual pixels in the array provide long conductors on which static charge can be picked up and subsequently transferred to the TFT electrodes.

This static charge may result in breakdown of the gate insulating layer, and can result in a voltage differential between the gate and source electrodes or the gate and drain electrodes which can in turn cause the threshold voltage of the TFTs to shift.

The problem of ESD damage is not confined to TFT array devices but can be found also in array devices using alternative kinds of switching elements, for example two terminal devices such as thin film diodes or other non-linear devices.

The need to prevent ESD damage is widely recognised, and several different approaches have been developed. One example is the use of shorting bars surrounding the TFT array which link all of the source lines and gate lines of the individual TFTs together. The shorting lines are manufactured at the same time as the gate and source lines, so that the gate and source electrodes remain at the same potential throughout the fabrication process. This prevents any voltage differential from occurring across electrodes of the transistors, and therefore prevents ESD damage within the TFT devices.

However, the shorting lines must be removed from the device before the switching array can be used. This requires a cutting process, which is typically carried out after testing of the TFT switches, but before connection of the TFT array to peripheral circuitry. This introduces additional processing steps, and also means that the ESD protection is not available during the operation of connecting peripheral circuitry to the TFT array.

It is also known to provide ESD damage protection circuits which remain in place even during operation of the device. These circuits typically allow charge to flow between a common electrode and the row or column lines when a voltage differential is exceeded. A problem with these circuits is that they may consume a considerable proportion of the total power budget of the device. For example, in low power active matrix LCD applications, more than 50% of the total display power budget may be consumed by the protection circuits. Therefore, whilst these circuits may provide protection during fabrication of the TFT array and also during connection of peripheral circuitry, unacceptably high levels of power consumption may result during operation of the manufactured device.

According to the invention, there is provided an electronic device comprising:

an array of pixels provided on a substrate and arranged in rows and columns, each pixel comprising a switching element;

a plurality of row and column address lines for addressing each pixel;

wherein each row and column address line is connected to a first discharge element through a first discharge device and to a second discharge element through a second discharge device, wherein the first discharge device allows the passage of charge between the address line and the first discharge element when the address line is at a potential below that of the first discharge element, and the second discharge device allows the passage of charge between the address line and the second discharge element when the address line is at a potential above that of the second discharge element.

Each row and column is associated with two discharge elements, one of which is used to discharge electrostatic charges resulting in an increase in voltage on the row or column address line, and the other of which is used to discharge electrostatic charges resulting in a drop in the voltage on the row or column address line. By providing suitable voltages on the two discharge elements during operation of the manufactured device, it is possible to prevent the discharge devices from operating. In particular, during operation of the device, voltages may be provided on the discharge elements which result in all of the discharge devices being reverse-biased, for all normal operating voltages applied to the row and column address lines.

The first and second discharge elements may each comprise a conductive track to which all rows and columns are connected through a respective discharge device. The two tracks may then be arranged around the periphery of the pixel array.

Each discharge element may comprise at least one diode-connected transistor. During fabrication of the device, no external voltages are applied to the discharge elements, and any electrostatic charge resulting in a change in voltage sufficient to overcome the effective diode turn-on voltage will result in forward bias of the diode-connected transistor, so that charges can be dissipated to one or other of the discharge elements. However, during operation of the device, voltages are applied to the discharge elements so that the diode-connected transistors are always reverse-biased.

Preferably, therefore, the first discharge element is connected to a voltage supply line for supplying a first, lowest, voltage to the pixels, and the second discharge element is connected to a voltage supply line for supplying a second, highest, voltage to the pixels.

During fabrication of the device, it is preferable for the two discharge elements to be coupled together. This may be provided by a temporary short circuit between the first and second discharge elements, which may be broken before operation of the fabricated device. Alternatively, a diode ladder may be provided between the first and second discharge element. This diode ladder will have a sufficiently high resistance that when the supply voltages are applied to the discharge elements, a low power dissipation results even if the diode ladder is left in place during operation of the device.

As a further alternative, a protection circuit may be provided between the first and second discharge elements, the protection circuit providing first and second paths between the first and second discharge elements, each path having a transistor, wherein with no external voltages applied to the first and second discharge elements, the first path provides electrostatic protection, and the transistor in the second path is turned off, and with external voltages applied to the first and second discharge elements, the transistor in the first path is turned off, and the transistor in the second path is turned on and provides a high impedance between the first and second discharge elements.

This protection circuit allows charges to flow between the two discharge elements when no external voltages are applied, but provides a much greater impedance between the two discharge elements when external voltages are applied, turning off the transistor in the first path. Again, the external voltages may comprise the lowest drive voltage required by the device (which is connected to the first discharge element), and the highest voltage required by the device (which is connected to the second discharge element).

In particular, the protection circuit may comprise a first path between the first and second discharge elements, comprising a first transistor, a second path between the first and second discharge elements, comprising a second transistor and a resistor in series, wherein the gate of the first transistor is connected to the junction between the resistor and the second transistor, and wherein the second transistor has a gate control line to enable it to be turned on or off.

This circuit is arranged such that with no signal applied to the gate control line, the second transistor is turned off, and when the second transistor is turned on, the voltage at the junction turns off the first transistor.

The device of the invention may typically comprise a liquid crystal display.

Although particularly useful in pixellated devices whose pixels include TFTs, the invention is applicable also to array devices using alternative kinds of switching elements such as two terminal non-linear devices, for example thin film diode elements.

BRIEF DESCRIPTION OF THE DRAWING FIGURES

Examples of the invention will now be described in detail with reference to the accompanying drawings, in which.

The Figures are merely schematic and are not drawn to scale. The same reference numbers are used throughout the Figures to denote the same or similar parts.

DETAILED DESCRIPTION

Figure 1:
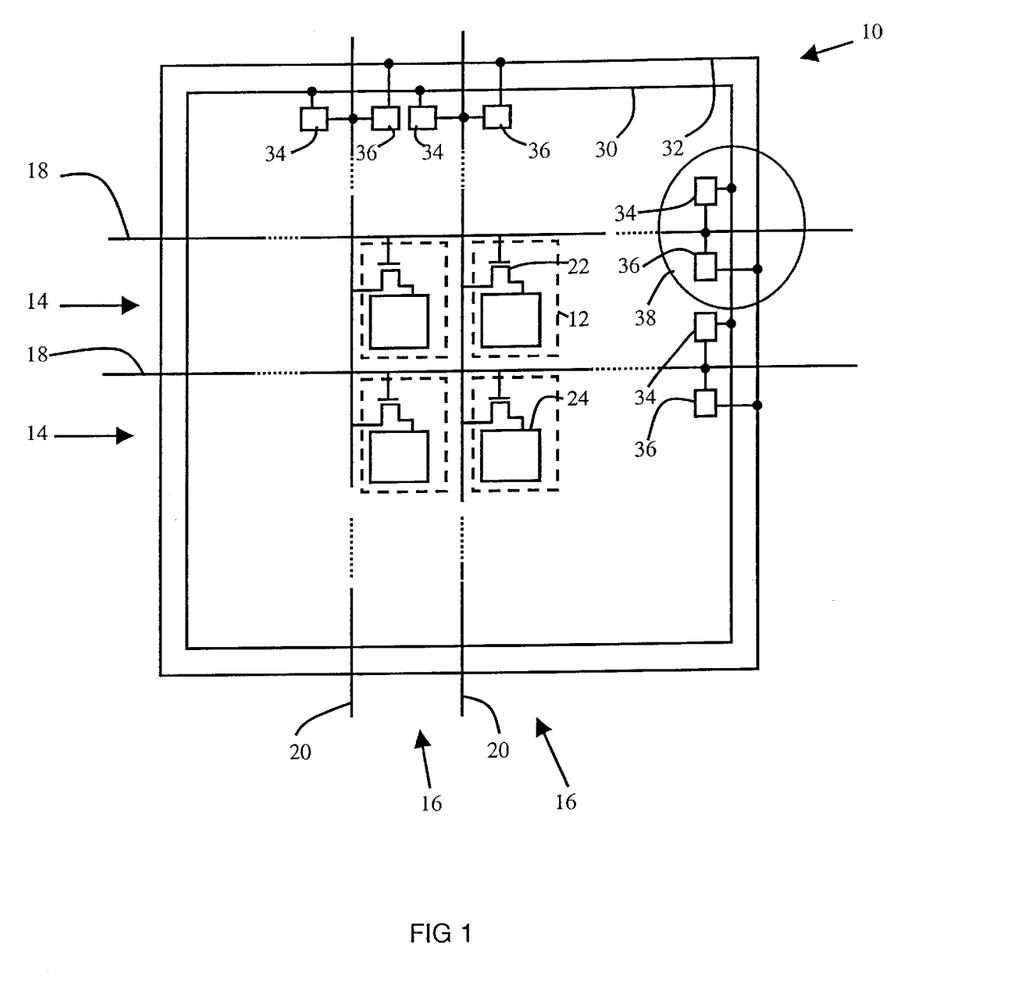
FIG. 1 shows an electronic device according to the invention.

FIG. 1 shows an electronic device 10 comprising an array of pixels 12 arranged in rows 14 and columns 16. Each row 14 of pixels shares a common row conductor 18, and each column of pixels shares a common column conductor 20. Each pixel 12 is thus associated with a unique combination of row and column conductors, enabling individual pixels to be addressed.

As shown schematically in FIG. 1, each pixel comprises a drive transistor 22 and a pixel electrode 24. The gate of the drive transistor 22 of each pixel is connected to the associated row conductor 18. In this way, signals provided to the row conductors 18 enable the pixel transistors to be turned on or off. When a pixel transistor 22 is turned on, it allows the passage of current between the column conductor 20 and the pixel electrode 24.

The structure described above is conventional, and various types of electronic device may include this structure. For example, the device may comprise an active matrix liquid crystal display device, in which case, the pixel electrode 24 is used to modulate a portion of a liquid crystal material layer, or other active matrix display device such as an electrophoretic display device or active matrix LED display device in which the transistor is used to control current through an LED display element. Alternatively, the device may comprise a sensing array device such as a radiation imaging device, in which case the pixel electrodes 24 may comprise a light receiving electrode of a photodiode, or other light-sensitive component. In each case, each pixel may comprise additional components, such as capacitors, and the representation in FIG. 1 is purely schematic.

This invention is concerned with all types of device in which arrays of active switching elements such as transistors, particularly thin film transistors, are fabricated on a common substrate. It is for this reason that each pixel 12 is simply represented as a transistor 22 and an electrode 24, although it should be appreciated that other kinds of switching elements could be used.

As described above, a problem arises in the fabrication of this type of array device when electrostatic charges are allowed to build up on the row and column conductors 18, 20, as these charges can result in damage to the layers forming the transistors 22.

In accordance with the invention, each row and column conductor 18, 20 is coupled to two discharge elements 30, 32 in the form of conductive lines extending around the periphery of the pixel array. Each row and column conductor is coupled to the first discharge line 30 through a first discharge device 34 and is coupled to the second discharge line 32 through a second discharge device 36.

Each discharge device 34, 36 provides diode-like characteristics, namely allowing the passage of charge when a voltage between the row or column conductor 18, 20 and the associated discharge line 30, 32 exceeds a turn-on threshold.

Figure 2:
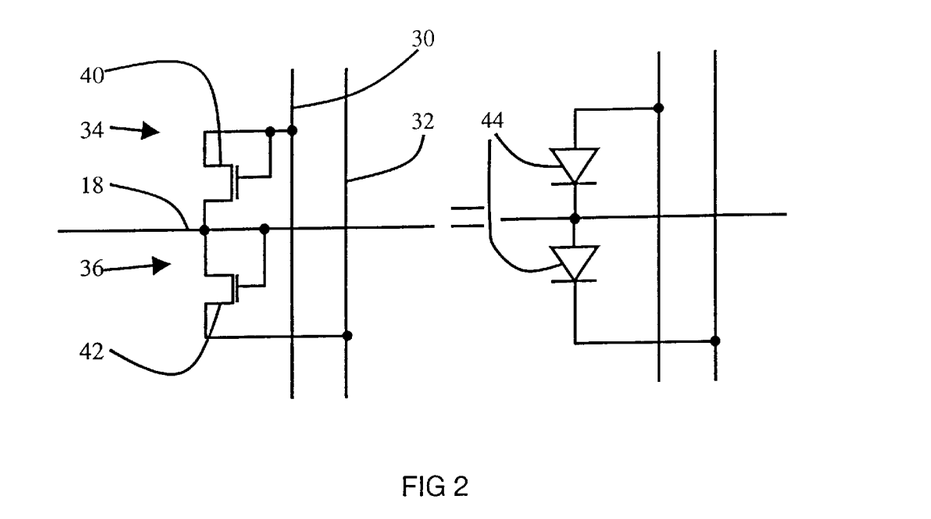
FIG. 2 shows one example of the first and second discharge devices associated with each row and column conductor in the device of FIG. 1.

FIG. 2 shows in greater detail the area 38 circled in FIG. 1. The same circuit is associated with each row and column conductor.

As shown, the first discharge device 34 comprises a thin film transistor 40, formed using the same processing steps as required for the pixel transistors 22. The drain of the transistor 40 is connected to the first discharge line 30 and the source is connected to the row conductor 18. The drain is coupled to the gate, to provide diode-like operating characteristics. In other words, if the voltage on the drain is a sufficient level above the voltage on the source, the transistor 40 will conduct. In this way, the first discharge device 34 conducts when the row conductor 18 is at a potential sufficiently below the potential of the first discharge line 30, namely lower by at least the turn-on voltage of the diode-connected transistor. The second discharge device 36 also comprises a transistor 42 with the gate and drain coupled together. The second transistor conducts when the row conductor 18 is at a potential sufficiently above the potential of the second discharge line 32. FIG. 2 also shows the equivalent circuit, representing the diode-connected transistors as diodes 44.

If there is a build-up of electrostatic charges on any individual row or column conductor 18, 20, this will cause the potential on the conductor to change (with respect to the potential of the other row and column conductors) so that one of the discharge devices will conduct, to dissipate the excess charges to one of the lines 30, 32. Some form of coupling is required between the lines 30, 32 to prevent the voltages on the two lines 30, 32 simply floating as the voltages on the row and column conductors 18, 20 vary.

Figure 3:
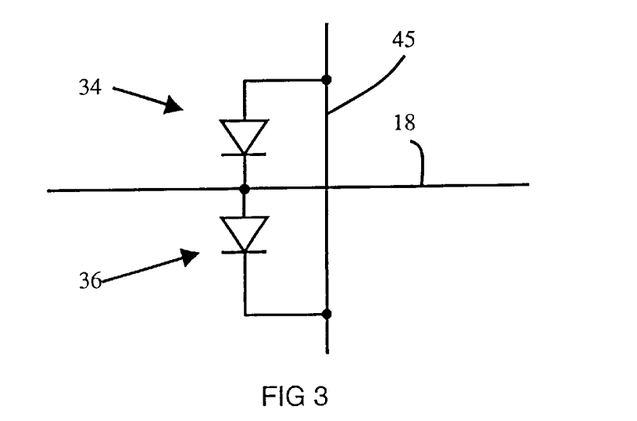
FIG. 3 shows an equivalent circuit of FIG. 2 when the discharge elements are connected together.

One possibility is to electrically connect the two discharge lines 30, 32. This provides the equivalent circuit shown in FIG. 3. In this case, variations in the voltage on the row conductor 18 cannot simply be followed by the shared discharge line 45 because the discharge devices 34, 36 associated with other rows and columns will conduct, so that the shared discharge line 45 will always remain at a voltage near the average voltage on all of the row and column conductors 18, 20. However, the use of a single discharge line 45 as shown in FIG. 3 results in high power consumption when the device is in use. In particular, the voltages on the row and column conductors 18, 20 will vary between the maximum and minimum gate and source voltages of the pixel transistors 22. As a result, normal operation of the pixels will result in some current flow in the discharge devices, resulting in wasted power consumption.

The invention enables ESD damage protection to be provided during fabrication of the array, but also enables the power consumption of the protection circuits to be reduced significantly during use of the device. To achieve this, the discharge line 30 is driven to a voltage equal to or below the lowest pixel transistor gate (row) or drain (column) voltage expected on the row and column conductors 18, 20 during operation of the device. The second discharge line 32 is driven to a voltage equal to or greater than the maximum gate or source voltage. As a result, any normal fluctuations in the voltages on the row and column conductors during operation of the device will not be sufficient to turn on either of the discharge devices 34, 36, thereby eliminating power consumption (other than resulting from leakage currents).

Figure 4:
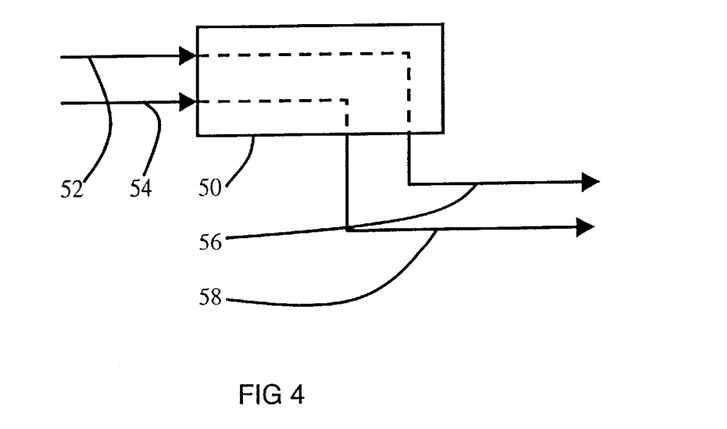
FIG. 4 shows how the voltages are derived for the discharge elements.

One possibility is simply to apply the maximum and minimum power rail signals driving the peripheral ICs (row and column address circuits) to the two discharge lines. As shown in FIG. 4, the peripheral IC 50 is driven by a high power rail 52 and a low power rail 54, and these voltages are provided by the circuit 50 as outputs 56, 58 for connection to the discharge lines 30, 32. Alternatively, the peripheral IC 50 may itself generate the voltage outputs 56, 58.

As mentioned above, it is desirable for the discharge lines 30, 32 to be connected together to improve the ESD protection during fabrication of the array, but this connection should not be maintained when the device is to be used.

Figure 5:
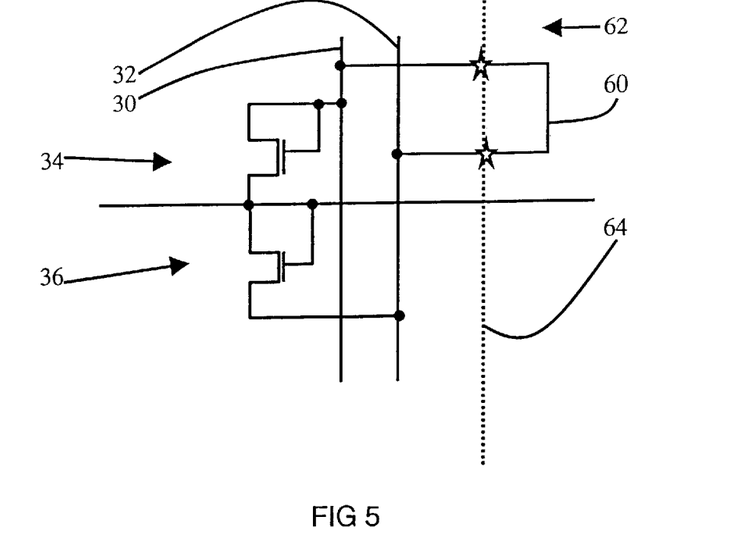
FIG. 5 shows a first arrangement for coupling the first and second discharge elements.

As shown in FIG. 5, a temporary short circuit 60 may be provided between the discharge lines 30, 32, arranged as a track coupling the two discharge lines together. This track may extend to an area 62 of the substrate which is to be removed after fabrication, along dotted line 64 shown in FIG. 5. In this way, a short circuit is provided during fabrication of the array of transistors, but this short circuit is broken before the device is to be operated.

Figure 6:
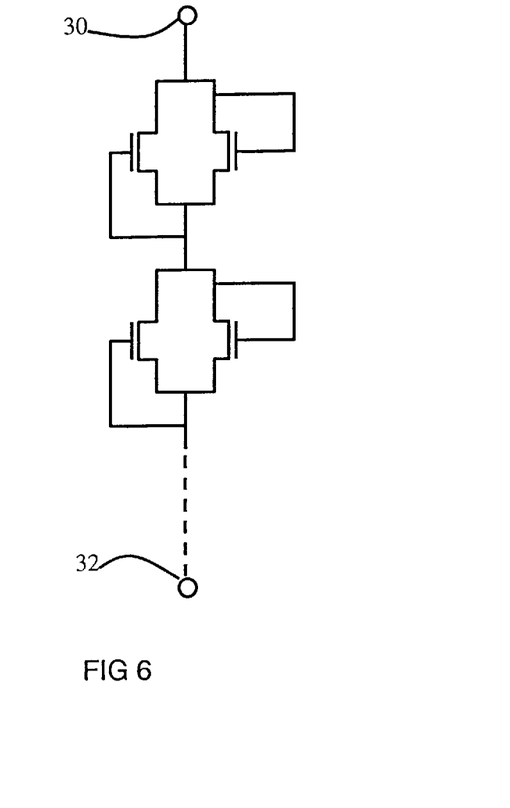
FIG. 6 shows a second arrangement for coupling the discharge elements.

In order to avoid the need to physically remove portions of the substrate, the two discharge lines 30, 32 may be connected together using a diode-connected TFT ladder, as shown in FIG. 6. This can be arranged to provide minimal current flow through it during operation, so that it does not need to be removed. To minimise the current flow through the ladder, the width to length ratio of each transistor, and the number of devices in series are chosen for a specific set of discharge lines.

One problem with the use of a temporary short circuit is that the ESD protection is no longer effective once the short circuit has been removed. Typically, the short circuit will be removed after the fabrication process, but before connection of the peripheral circuitry to the array. Thus, although ESD protection is provided during the fabrication process, damage can still result during IC mounting.

Figure 7:
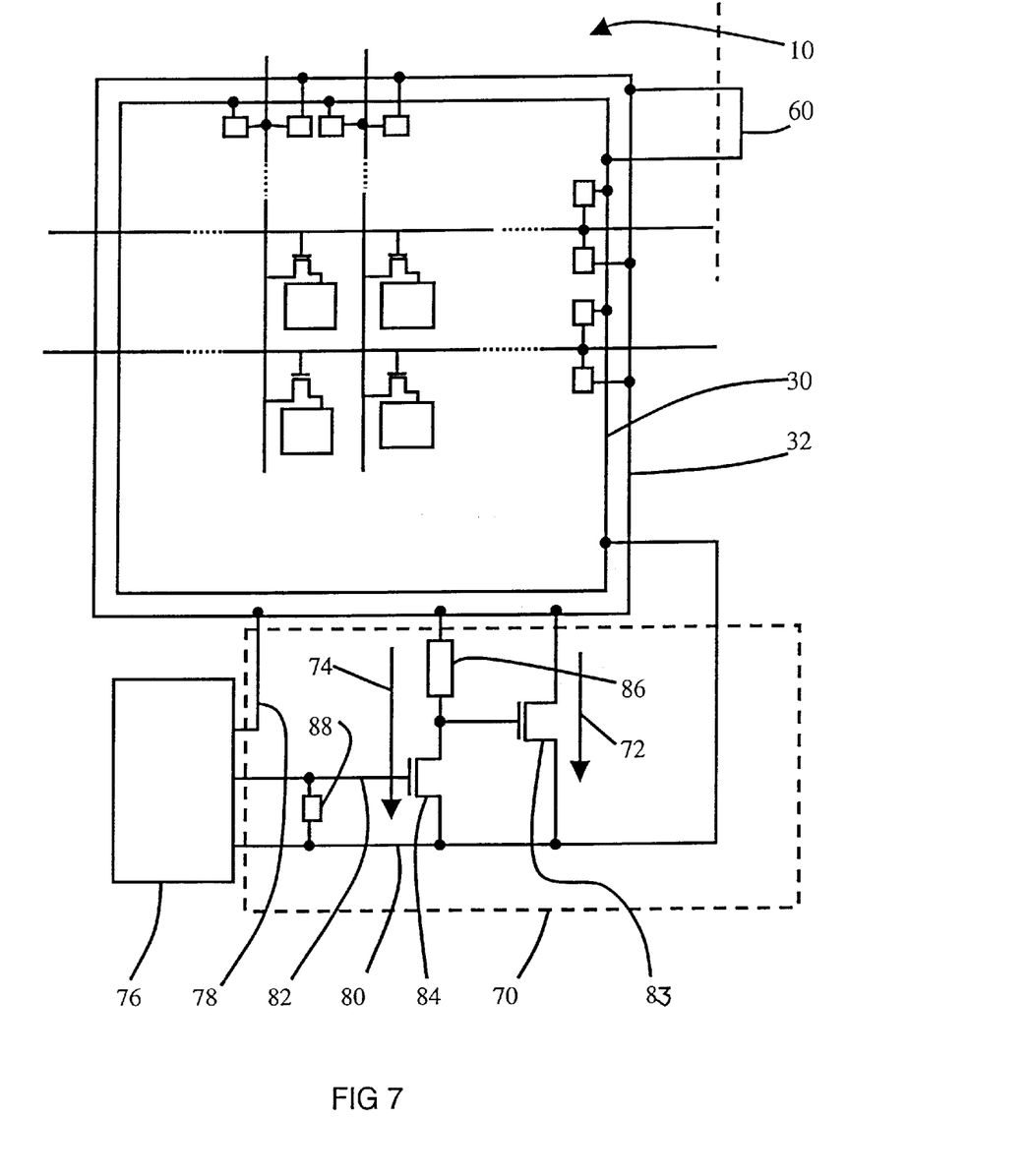
FIG. 7 shows a third possible arrangement for coupling the discharge elements.

FIG. 7 shows an additional protection circuit 70 provided between the discharge lines 30, 32, and which may be fabricated integrally with the pixel array. Alternatively, it may be fabricated separately and attached to the pixel array before IC mounting. The protection circuit can be used to supplement a temporary short circuit 60 to provide protection during IC mounting after the short circuit has been removed. Alternatively, the protection circuit may be used to provide ESD damage protection during fabrication as well as during IC mounting. In this case, there is no need for removal of circuit portions.

The protection circuit 70 provides a first discharge path 72 and a second discharge path 74 between the first and second discharge lines 30, 32. The first discharge path 72 has a low impedance, and provides coupling of the two discharge lines 30, 32 during IC mounting. The second discharge path 74 has a high impedance, and is used during operation of the device. This results in low power consumption.

Block 76 represents the power supply for the peripheral circuitry. The power supply provides the high voltage rail 78, the low voltage rail 80 and an intermediate voltage rail 82.

The first discharge path comprises a first transistor 83, and the second discharge path 74 comprises a second transistor 84 and a resistive element 86 in series. The second transistor 84 is turned on or off by the intermediate power level 82, which is applied to the gate.

During IC mounting, the power supply is turned off, so that no voltages are provided on the rails 78, 80, 82. As a result, the second transistor 84 is turned off thereby breaking the discharge path 74. The resistive element 86 and the transistor 83 effectively operate as a diode-connected transistor, and provide coupling between the discharge lines 30, 32. In particular, if the voltage on the second discharge line 32 increases or if the voltage on the first discharge line 30 decreases, the transistor 83 provides a connection between the discharge lines. In this way, ESD protection is provided during mounting of the peripheral circuits.

During operation of the device, the power supply 76 is turned on. This has the effect of turning on the second transistor 84. This pulls the gate voltage on the first transistor 83 sufficiently to turn off the first transistor 83 and thereby break the discharge path 72. To achieve this, the on resistance of the transistor 84 is much lower than the resistance of component 86. Thus, the connection between the discharge lines 30, 32 is via the higher resistance discharge path 74, so that the power consumption of the protection circuit 70 is greatly reduced.

A further resistive element 88 is shown in FIG. 7, which is optional, but which ensures that the transistor 84 is turned off when the power supply 76 is turned off.

All of the components in the protection circuit 70 may be implemented using thin film transistors. In particular, the resistive elements 86, 88 may be formed as single or multiple diode-connected transistors, which provide a definable resistance in the reverse-bias direction.

Figure 8:
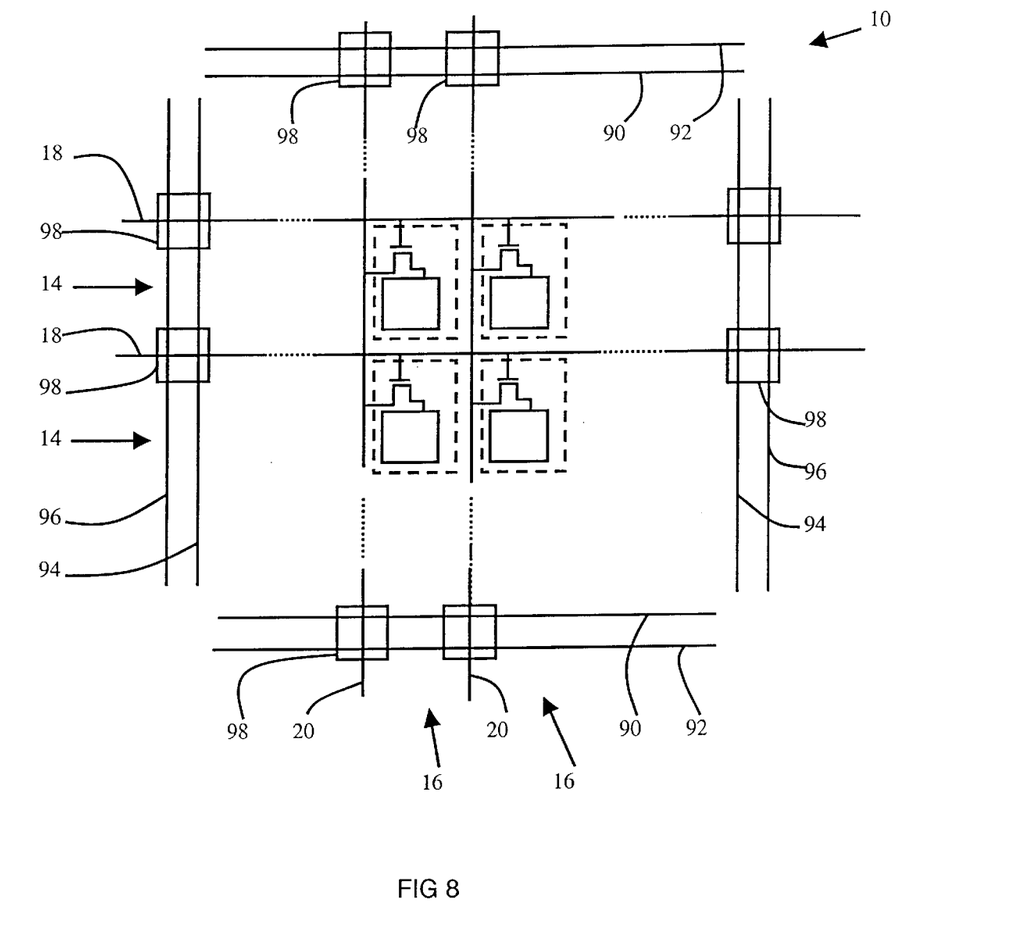
FIG. 8 shows a second example of electronic device according to the invention.

In the description above, the discharge lines 30, 32 have been shown as shared between all row and column conductors. Instead, separate row and column discharge bars may be provided. FIG. 8 shows a device 10 in which separate row discharge lines 90, 92 and column discharge lines 94, 96 are provided. The discharge devices have been represented schematically as circuitry 98 which operates in exactly the same manner as described above. However, the use of separate row and column discharge lines enables the discharge circuitry to be designed for the specific voltages expected on the row and column lines during normal operation of the device. For example, the row driver of a liquid crystal display typically provides voltage levels between around +20 V and −20 V on the row conductors, in order to provide the required turn on and turn off characteristics for the pixel transistor. The column driver, however, typically provides voltages on the column conductors with a voltage swing of only around 5 V.

In the example shown in FIG. 8, discharge circuitry 98 is provided at each end of each of the row and column conductors. This minimises the path length between individual pixel circuits and the nearest discharge circuit.

The pair of discharge lines 94, 96 at one end of the rows may or may not be connected to the pair of discharge lines 94, 96 at the opposite end of the rows, and similarly the pair of discharge lines 90, 92 at one end of the columns may or may not be connected to the pair of discharge lines at the opposite end of the columns.

In the example above, the discharge devices have been represented as a single diode-connected transistor. Of course, multiple diode-connected transistors may be used to form each discharge device 34, 36.

The specific examples of a radiation sensor and a liquid crystal display have been mentioned above. No detailed description is given of the precise pixel layout of each of these types of device, as this will be well known to those skilled in the art. The invention can be used to prevent damage during fabrication of any array device.

Various modifications will be apparent to those skilled in the art.

What is claimed is:

1. An electronic device comprising:
    an array of pixels provided on a substrate and arranged in rows and columns, each pixel comprising a switching element;
    a plurality of row and column address lines for addressing each pixel;
    wherein each row and column address line is connected to a first discharge element through a first discharge device and to a second discharge element through a second discharge device,
    wherein the first discharge device allows the passage of charge between the address line and the first discharge element when the address line is at a potential below that of the first discharge element, and
    the second discharge device allows the passage of charge between the address line and the second discharge element when the address line is at a potential above that of the second discharge element.

2. A device as claimed in claim 1, wherein the first discharge element comprises a conductive track to which all rows and columns are connected through a respective first discharge device.

3. A device as claimed in claim 2, wherein the conductive track is arranged around the periphery of the pixel array.

4. A device as claimed in claim 1, wherein the second discharge element comprises a conductive track to which all rows and columns are connected through a respective second discharge device.

5. A device as claimed in claim 4, wherein the conductive track is arranged around the periphery of the pixel array.

6. A device as claimed in claim 1, wherein each row address line is connected to a first discharge element through a first discharge device and to a second discharge element through a second discharge device, and wherein each column address line is connected to a third discharge element through a first discharge device and to a fourth discharge element through a second discharge device.

7. A device as claimed in claim 6, wherein the first and second discharge elements comprise conductive tracks to which all rows are connected through a respective discharge device, and the third and fourth discharge elements comprise conductive tracks to which all columns are connected through a respective discharge device.

8. A device as claimed in claim 1, wherein each discharge element comprises at least one diode-connected transistor.

9. A device as claimed in claim 1 wherein the first discharge element is connected to a voltage supply line for supplying a first, low, voltage to the pixels and the second discharge element is connected to a voltage supply line for supplying a second, high, voltage to the pixels.

10. A device as claimed in claim 1, wherein a diode ladder is provided between the first and second discharge elements.

11. A device as claimed in claims 1, wherein a temporary short circuit is provided between the first and second discharge elements.

12. A device as claimed in claim 1, wherein a protection circuit is provided between the first and second discharge elements, the protection circuit providing first and second paths between the first and second discharge elements, each path having a transistor,
    wherein with no external voltages applied to the first and second discharge elements, the first path provides electrostatic protection, and the transistor in the second path is turned off, and with external voltages applied to the first and second discharge elements, the transistor in the first path is turned off, and the transistor in the second path is turned on and provides a high impedance between the first and second discharge elements.

13. A device as claimed in claim 12, wherein the protection circuit further comprises a first connection for connecting a first, low, external voltage to the first discharge element and a second connection for connecting a second, high, voltage to second discharge element.

14. A device as claimed in claim 1 wherein a protection circuit is provided between the first and second discharge elements, the protection circuit comprising:
- a first path between the first and second discharge elements, comprising a first transistor;
- a second path between the first and second discharge elements, comprising a second transistor and a resistor in series,
- wherein the gate of the first transistor is connected to the junction between the resistor and the second transistor, and wherein the second transistor has a gate control line to enable it to be turned on or off.

15. A device as claimed in claim 14, wherein with no signal applied to the gate control line, the second transistor is turned off, and wherein if the second transistor is turned on, the voltage at the junction is such as to turn off the first transistor.

16. A device as claimed in claim 1, comprising a liquid crystal display.

17. A device as claimed in claim 1, wherein the switching elements of the pixels comprise thin film transistors.

18. A device as claimed in claim 3, wherein
the second discharge element includes another conductive track that is also arranged around the periphery of the pixel array.

19. A device as claimed in claim 18, wherein
each discharge element comprises at least one diode-connected transistor.

20. A device as claimed in claim 19, further including
a protection circuit between the first and second discharge elements.

* * * * *